United States Patent
Willich et al.

[15] 3,690,425
[45] Sept. 12, 1972

[54] HYDRAULICALLY DAMPED VEHICLE SUSPENSION DEVICE

[72] Inventors: Jean Herbert Willich, Am Hohlweg 17, Ennepetal-Altenvoerde, Germany; Walter Bruninghaus, deceased, late of Ennepetal-Voerde, Germany; Gisela Bruninghaus, administratrix, Loher Str. 134, 2828 Ennepetal-Voerde, Germany

[22] Filed: Sept. 10, 1970

[21] Appl. No.: 71,085

[30] Foreign Application Priority Data

Sept. 10, 1969 Germany..........P 19 45 674.7

[52] U.S. Cl.................188/321, 188/322, 280/124 A
[51] Int. Cl. ..............................................F16f 9/54
[58] Field of Search..188/321, 322, 266, 274, 264 B; 280/93, 124 A

[56] References Cited

UNITED STATES PATENTS 3,499,505   3/1970   De Carbon................188/322

*Primary Examiner*—George E. A. Halvosa
*Attorney*—Karl F. Ross

[57] ABSTRACT

A hydraulically damped vehicular suspension device comprises a self-contained damper unit which incorporates a shock absorber and which can be easily fitted into a pipe carrying a wheel-axle journal at its lower end. In order to replace the damper unit in the outer pipe it is only necessary to unscrew a lock nut and uncouple the damping cylinder of the inserted unit from the vehicle chassis. The device may also include means for cooling the damping cylinder in use.

8 Claims, 4 Drawing Figures

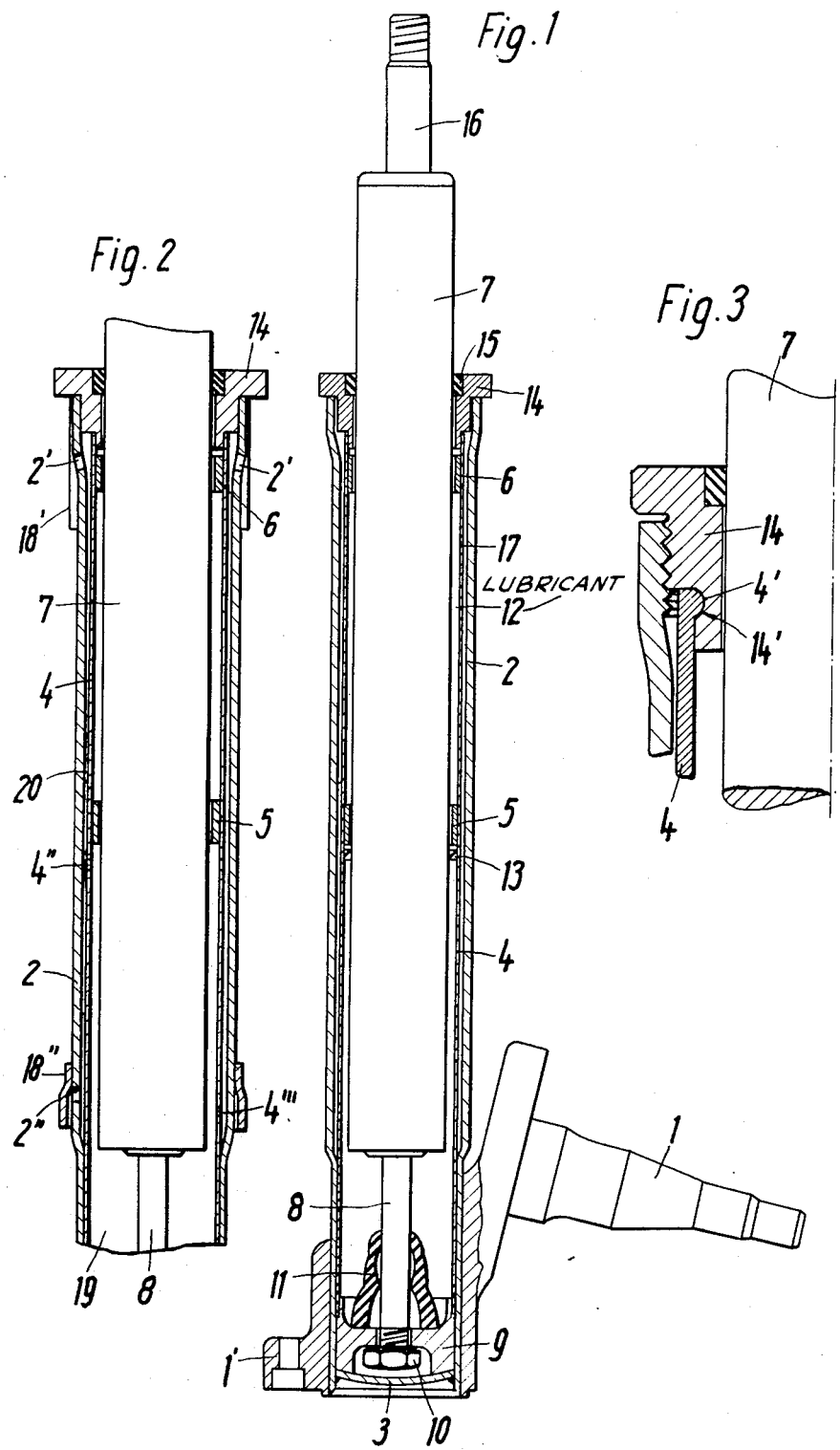

HYDRAULICALLY DAMPED VEHICLE SUSPENSION DEVICE

Our present invention relates to a hydraulically damped suspension system for vehicles, and in particular to a suspension device vehicular front axles.

The suspension device or assembly with which the invention is concerned is of the type which comprises an outer pipe provided at its lower end with a wheel-axle journal, and a hydraulic shock absorber received in the pipe; the shock absorber includes a damping cylinder, connectable at its upper end with the vehicle chassis and slidably displaceable relative to the outer pipe, and a piston rod which extends downwardly from the damping cylinder in sealed relationship therewith and is connected with the lower end of the outer pipe so as to be incapable of axial movement relative thereto.

Known hydraulic suspension devices of this type have considerable bending strength owing to the comparatively large diameter of the guide surfaces between the outer pipe bearing the wheel-axle journal and the damping cylinder mounted slidably therein. This makes them particularly suitable for the damped suspension of vehicular front axles because substantial lateral forces and stresses occur there during vehicle movement. These lateral forces are absorbed by the guide surfaces between the damping cylinder and the outer pipe, so that the piston rod and the working piston of the damping cylinder are not thereby stressed. In conventional front-axle suspensions the lower end of the piston rod of the shock absorber extends through a base plate in the outer pipe and is secured to the latter by a nut. This nut, however, is inaccessible from the outside when the suspension device is in its assembled state, because it is masked from below by the axle-rod ball joint which is flanged to the outer pipe. This is a great disadvantage whenever it is necessary to disassemble the shock absorber because the axle rod must be removed first from the outer pipe carrying the wheel-axle journal before the piston rod can be released from the base plate of the outer pipe. Only then, after disengaging the top of the attachment from its mounting bracket on the vehicle chassis, can the shock absorber be removed upwardly from the outer pipe and replaced. Guide rings for the cylinder in the outer pipe, as well as lubricant located between the guide rings, are thereby exposed, which requires a very careful and complicated reassembly process because the bearing surfaces of the guide rings must not become dirty or damaged; the lubricant must be renewed each time.

It is an object of the present invention to provide a hydraulically damped vehicular suspension device, particularly for front axles, which does not have the aforesaid disadvantages but which on the contrary permits a fast, effortless replacement of the shock absorber of the device without impairing the function of the suspension device.

It is a further object of the invention to provide a self-contained damper unit, incorporating a shock absorber, which can be bodily introduced into and extracted from the outer pipe when necessary.

In accordance with the invention, cylinder and its piston rod, are spacedly surrounded by a guide tube coupled with the lower end of the piston rod, with interposition of annular guide means between the guide tube and the damping cylinder, the guide tube being realeasably locked to the outer pipe against relative axial displacement.

The guide tube of the damping unit is preferably provided at its lower end with a base plug through which the piston rod extends for coupling engagement therewith, and the releasable locking means preferably comprises a clamping nut which engages the upper end of the guide tube, is screwed into the outer pipe and urges the base plug of the guide tube against a fixed end plate of the outer pipe acting as a bottom stop for the inserted unit.

In this way, the damping unit consisting of the shock absorber and guide tube can be installed and replaced extremely easily in the outer pipe, because the axle rod which is coupled at the lower end of the outer pipe no longer needs to be released. Furthermore, unscrewing the clamping or lock nut from the outer pipe, and then detaching the suspension device from the chassis, is all that is necessary to permit the damping unit to be effortlessly withdrawn from the outer pipe.

Preferably, the lock nut is coupled to the upper end of the guide tube so as to be rotatable relative thereto but incapable of relative axial movement, and is provided with an annular seal engaging the damping cylinder. This results in a compact, self-contained, workshop-assembled unit which can be conveniently inserted and removed The annular guide means may comprise two guide rings or sleeves which are secured to the guide tube with the greatest possible axial spacing from each other, lubricant may be provided in the chamber between the sleeves, with a sealing ring below at least the lower sleeve.

According to a further advantageous feature of the invention, air holes may be provided in the guide tube below the lowest guide sleeve, as well as in the outer pipe at a higher level, to enable cooling air to circulate around the damping cylinder. Alternatively, for cooling purposes, the annular chamber between the outer pipe and the guide tube may be filled with oil or some other coolant in order to achieve an improved conduction of heat from the damping unit to the outer pipe.

Three embodiments of a vehicular front-axle suspension assembly according to the invention will now be described by way of example and with reference to the accompanying drawing, in which:

FIG. 1 is an axial longitudinal section through a first embodiment of our invention;

FIG. 2 is an axial longitudinal section through a second embodiment;

FIG. 3 is a detail view showing the design and arrangement of a lock nut at the upper end of a guide tube in either of these embodiments; and, FIG. 4 is an axial longitudinal section through a third embodiment.

Figure 4:
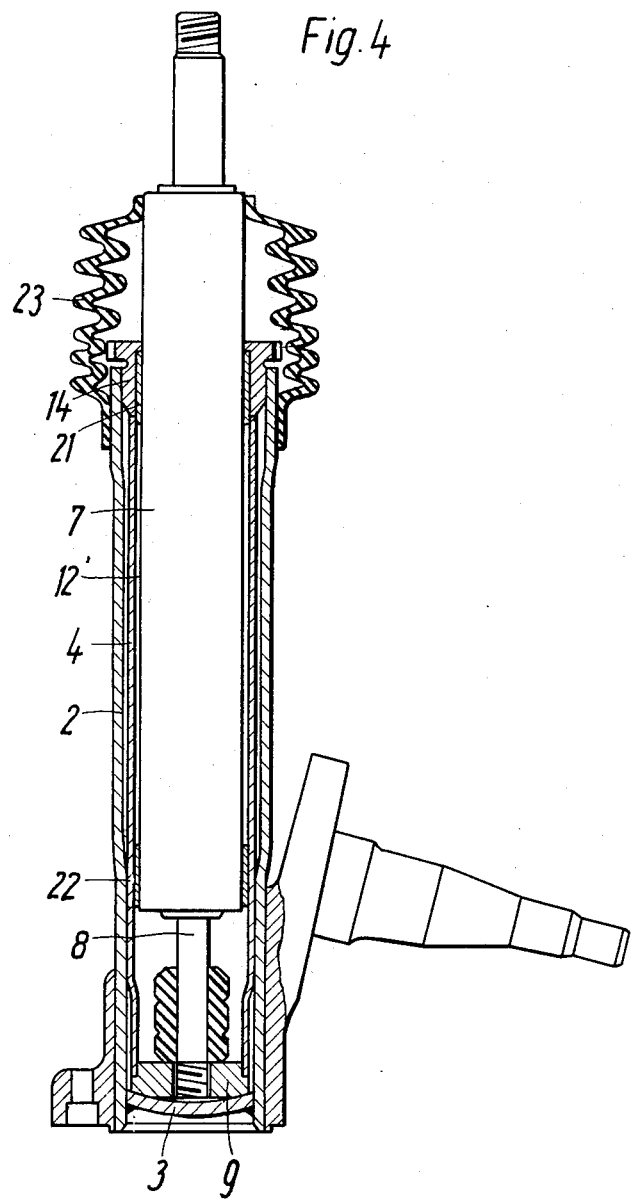

The vehicular front-axle suspension assembly illustrated in FIG. 1 comprises an upright, open-topped outer pipe 2 which carries a wheel-axle journal 1 at its lower end and which is provided with a welded bottom stop 3 and a bolted-on flange 1' for a vehicular axle rod and ball joint (not shown) to be secured below the stop 3; a damping unit is slidably received in the outer pipe 2. The damping unit comprises a guide tube 4 having centering rings or sleeves 5 and 6 fixed therein at the greatest possible axial distance from each other, and a damping cylinder 7 which is slidably displaceable within the guide tube 4 and sleeves 5 and 6, tube 4 and cylinder 7 being coaxial with pipe 2. A piston rod 8 projects downwardly from the cylinder 7 in sealed relationship therewith. The piston rod 8 is anchored to a base plug 9 of the guide tube 4 by means of a bottom nut 10 which is threaded onto the lower end of the piston rod. Above the base plug 9 is located a resilient cuff 11 which limits the downward movement of the damping cylinder 7 into the guide tube 4. The damping cylinder 7 is partially filled in known manner with a damping liquid and a pressurized gas which exerts a compressive force on the damping liquid, preferably through a separating piston. A working or damping piston secured inside the cylinder 7 to the end of the piston rod 8 is located within the damping liquid. Between the two guide sleeves 5 and 6 the annular space 12 defined between the damping cylinder 7 and the guide tube 4 is filled with a suitable lubricant, e.g. grease, oil or the like. This lubricant chamber 12 is closed at the bottom by a sealing ring 13 which is located beneath the sleeve 5 and is secured to the guide tube 4.

A clamping a lock nut 14 engages the upper end of the guide tube 4 as a relatively rotatable but axially fixed upward extension thereof and is screwed into an internally threaded portion of the upper end of the outer pipe 2. In this way the lock nut 14 presses the base plug 9 of the guide tube 4 against the plate 3 of the outer pipe 2 which underlies the bottom nut 10 engaging the threaded extremity of rod 8. The lock nut 14 is provided with a packing ring 15 which encircles the damping cylinder 7 to complete a seal between the cylinder 7 and the upper end of the guide tube 4. At its upper end the damping cylinder 7 is provided in known manner with a mounting bolt 16 by means of which the shock-absorber part of the damping unit is attachable to the vehicle chassis.

The preassembled damping unit incorporating the shock absorber comprises the damping cylinder 7, the piston rod 8, and the guide tube 4 together with its centering sleeves 5, 6 and lubricant in chamber 12. It is designed to be inserted as a completely closed unit into the outer pipe 2 and then retained therein by means of the lock nut 14. When replacement of the shock absorber is necessary, all that is needed is to loosen the lock nut 14 and to disconnect the top of the shock-absorber attachment from the chassis so that the damping unit can be withdrawn as a whole from the outer pipe 2 without decoupling the axle rod from the lower end of the outer pipe 2.

The annular clearance 17 between the outer pipe 2 and the guide tube 4 can be utilized to cool the damping cylinder by filling the chamber with a suitable coolant, e.g. a highly heat-conducting oil or the like.

As is shown in FIG. 3, the lock nut 14 at the upper end of the guide tube 4 is connected to the tube 4 so as to be rotatable relative thereto but preferably incapable of relative axial movement. This can be achieved for example by providing the lock nut 14 with a circumferential groove 14' into which an inner retaining bead 4' of the upper end of tube 4 matingly projects. This ensures that the lock nut 14 remains connected to the damping unit, even when the latter is removed from the outer pipe 2. It furthermore guarantees an effective sealing of the lubricant chamber 12 which is located between the damping cylinder 7 and the guide tube 4.

The suspension device illustrated in FIG. 2 is of basically the same construction as that shown in FIG. 1. It is, in particular, similarly provided with a lock nut 14, and with a guide tube 4 which is fixedly connected to the end of the piston rod 8, surrounds the damping cylinder 7 and the piston rod, and contains the centering rings or sleeves 5, 6. The primary difference is that in order to cool the damping cylinder 7 a plurality of air holes 4'', 4''' and 2', 2'' are provided in the guide tube 4 and in the outer pipe 2, respectively. In order to protect the air holes 2' and 2'' in the outer pipe 2 against the penetration of water, suitable close-fitting shrouds 18', 18'' are secured to the outside of pipe 2 to shield the holes 4', 2''. When the damping cylinder 7 moves downward, air is forced out of the inner chamber 19 through the holes 4'', 4''', the outer annular chamber 20, and the holes 2', 2'' in the outer pipe 2. On the other hand, with each upward movement of the damping cylinder 7, fresh air is aspirated in the reverse direction through the holes and outer chamber 20 into the inner chamber 19. This exchange of air results in a favorable cooling of the shock absorber and the guide sleeves 5, 6. Also, with the illustrated vertical staggering of the airholes 4'', 4''' and 2', 2'', a heat-syphon effect occurs even with a small pumping action, i.e. a small stroke of the working piston, since the warm air around the damping cylinder 7 beneath the lower sleeve 5 escapes upwardly through the holes 4'' into the outer chamber 20 and rises to the upper holes 2' while cooler air can then flow in from the outside by way of the lower air holes 2'' and 4'''.

The front-axle suspension device illustrated in FIG. 4 essentially differs from those shown in FIGS. 1 and 2 only in that the tube-mounted sleeves 5 and 6 for the guidance of damping cylinder 7 are replaced by an upper ring or guide sleeve 21 set in the lock nut 14 and a lower guide ring or sleeve 22 fixed to the bottom end of the damping cylinder 7. An annular cylindrical chamber 12' is thereby formed between the two sleeves 21, 22, the damping cylinder 7 and the guide tube 4, this chamber 12' having a variable volume which is dependent on the position of the damping cylinder 7 relative to the guide tube 4. A particularly high bending strength is thereby achieved since the guide sleeves 21, 22 are here placed at the greatest possible, even through variable, distance from each other. The annular chamber 12' preferably is partially filled with a lubricant which requires no special seals or wipers, e.g. a high-melting grease or a dry lubricant such as graphite or molykote.

In order to seal or enclose the lock nut 14 and the upper part of the damping cylinder 7 projecting therefrom, a collapsible boot or bellow secured to the projecting upper extremity of the damping cylinder 7 and to the top of pipe 2.

We claim:

1. A vehicular suspension device comprising:
   an open-topped upright pipe provided at its lower end with a wheel-axle journal and with an internal bottom stop;
   a damping unit extending from above into said pipe and resting on said bottom stop, said unit including a tube coaxial with said pipe, a damping cylinder provided with a downwardly projecting piston rod coaxially received in said tube with annular clearance, annular guide means in said clearance centering said cylinder with reference to said tube while enabling relative axial displacement thereof, said tube having a plugged lower end anchored to said piston rod and an upper end sealingly engaging said cylinder, and lubricant in said clearance facilitating relative axial motion between said tube and said cylinder, the latter being provided with mounting means for securing same to an overlying vehicular chassis; and releasable locking means detachably connecting the upper end of said tube with the top of said pipe, said damping unit being bodily extractable from said pipe upon the release of said locking means.

2. A suspension device as defined in claim 1 wherein said piston rod has a threaded extremity passing through said plugged lower end of said tube and provided with a bottom bearing from below upon said lower end, said bottom stop comprising a fixed plate underlying said bottom nut.

3. A suspension device as defined in claim 1 wherein the top of said pipe is internally threaded, said locking means comprising a clamping nut screwed into said top and secured to said tube as a rotatable but axially fixed upward extension thereof, said clamping nut being provided with packing means bearing upon said cylinder.

4. A suspension device as defined in claim 3, further comprising a bellows secured to the top of said pipe and to an upper extremity of said cylinder projecting from said tube, said bellows enveloping said clamping nut.

5. A suspension device as defined in claim 3 wherein said clamping nut is provided with an outer circumferential groove, said tube having an inner annular bead matingly engaging in said groove.

6. A suspension device as defined in claim 3 wherein said guide means comprises an upper ring adjacent said clamping nut and a lower ring axially spaced from said upper ring, said lower ring dividing said clearance into an upper chamber for said lubricant and a lower chamber open toward said plugged lower end.

7. A suspension device as defined in claim 6 wherein said tube is provided with at least one air hole beneath said lower ring, said pipe being provided with apertures at levels above and below said air hole to facilitate the pumping of atmospheric air into and out of said lower chamber.

8. A suspension device as defined in claim 7 wherein said pipe is externally provided with protective shroud means overlying said apertures.

* * * * *

UNITED STATES PATENT AND TRADEMARK OFFICE
CERTIFICATE OF CORRECTION

PATENT NO. : 3,690,425
DATED : 12 September 1972
INVENTOR(S) : Jean Herbert Willich et al It is certified that error appears in the above—identified patent and that said Letters Patent are hereby corrected as shown below:

In the heading of the patent, between the designation of the Inventors and the Application number, insert:

[73] Assignee: Firma August Bilstein
Ennepetal, Germany

Signed and Sealed this

Sixth Day of March 1979

[SEAL]

Attest:

RUTH C. MASON
Attesting Officer

DONALD W. BANNER
Commissioner of Patents and Trademarks